F. ROBINSON.
COOKING UTENSIL.
APPLICATION FILED SEPT. 28, 1906.
902,111.
Patented Oct. 27, 1908.
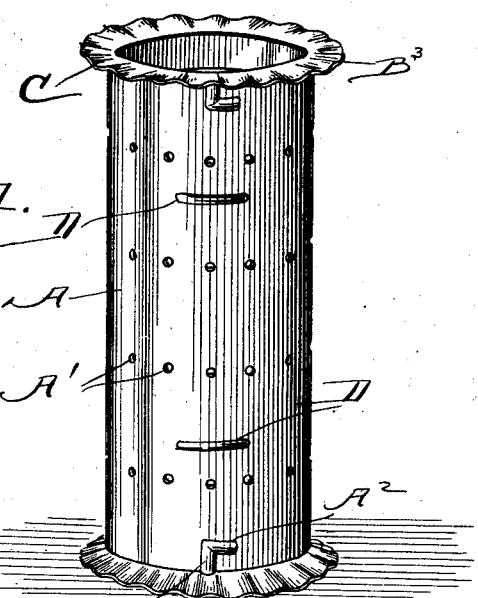
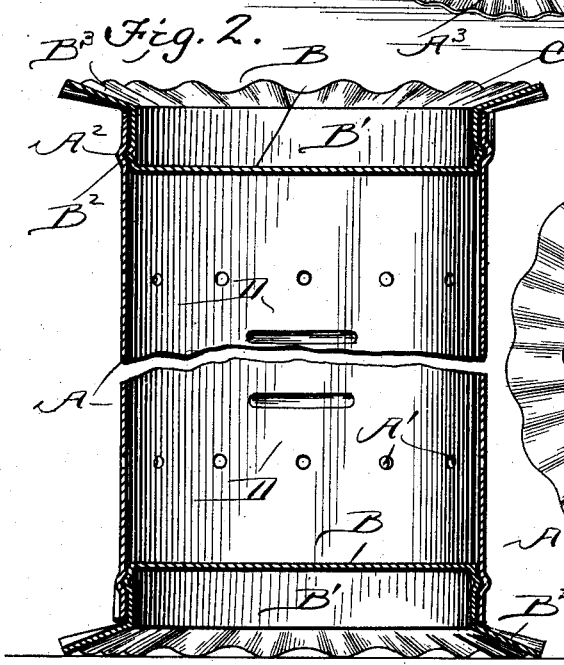
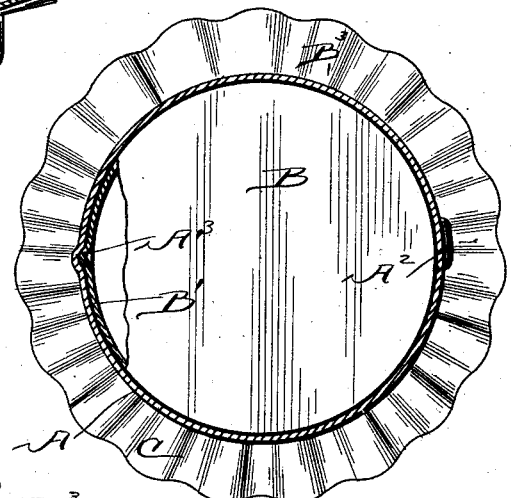
Inventor
F. Robinson,
Witnesses
By O'Meara & Buck
Attorney

UNITED STATES PATENT OFFICE.

FRANK ROBINSON, OF MESA, ARIZONA TERRITORY, ASSIGNOR OF ONE-HALF TO A. A. JONES AND JOHN W. HAGERLUND, OF MESA, ARIZONA TERRITORY.

COOKING UTENSIL.

No. 902,111.  Specification of Letters Patent.  Patented Oct. 27, 1908.

Application filed September 28, 1906. Serial No. 336,601.

*To all whom it may concern:*

Be it known that I, FRANK ROBINSON, a citizen of the United States, residing at Mesa, in the county of Maricopa and Territory of Arizona, have invented a new and useful Improvement in a Cooking Utensil, of which the following is a specification.

This invention relates to a cooking utensil and more especially to one designed for the purpose of cooking rice although it may also be used for other articles of food.

The invention consists of a perforated cylinder having removable end portions.

In the accompanying drawings:—Figure 1 is a perspective view of the utensil. Fig. 2 is a longitudinal section, the middle portion being broken out. Fig. 3 is a transverse section, a portion being broken out.

In these drawings A represents a cylinder formed in any desired manner and provided with perforations A'. The cylinder is provided with circumferential grooves $A^2$, upon its inner side, said grooves being arranged adjacent the ends of the cylinder. These grooves which are comparatively short in length connect at one end with short longitudinal extending grooves $A^3$, both grooves being formed by pressing the metal outwardly.

End caps B are provided with flanges B' which flanges slide within the cylinder A and are provided with projections $B^2$ adapted to engage the grooves $A^2$ and $A^3$. The flanges B' also carry each a flaring annular flange $B^3$ and these latter extend laterally beyond the cylinder A at each end of the same and form a support for the cylinder when it is laid in a horizontal position. The caps B are solid and tightly close the ends of the cylinder and when placed in position the projections $B^2$ slide inwardly in the grooves $B^3$ and the cap is then rotated slightly to carry the projections into the grooves $B^2$, thus rocking the caps in position.

In use the rice is placed in the cylinder in the desired quantity and the cylinder is then placed in any receptacle containing water and to which heat is applied, the cylinder being placed horizontally and being supported above the bottom of the receptacle by the flanges B', and being immersed in the water. As the rice swells the water will be expelled and the perforations A' close so that the rice in cooking will automatically regulate the amount of water necessary, as only the amount will remain in the cylinder which can be absorbed by the rice. Rice cooked in this manner will always be uniform in quality and will contain no surplus water as is the case with rice cooked in the usual style of double boilers. The device can also be used for cooking food when placed in a vertical position, still being submerged in water and in order to permit either end to rest downward and to permit a circulation of water beneath the device, while standing in a vertical position, I have escalloped the flanges $B^3$ as shown at C. Upon the cylinder A I have also formed circumferential ribs D, adjacent each end, which ribs indicate the amount of rice in its natural state to be placed within the cylinder, this being the amount which when swelled will entirely fill the cooking utensil. The device has also been found successful when used as a utensil for the purpose of cooking oatmeal and no stirring is required and there is no danger of scorching the article cooked.

Having thus fully described my invention, what I claim as new and desire to secure by Letters Patent, is:—

1. A cooking utensil of the kind described, comprising a cylinder perforated and open at the ends, and detachable caps, each cap having a flange adapted to slide within the cylinder and the flaring flange adapted to project without the cylinder.

2. A device of the kind described comprising a perforated cylinder having circumferential grooves upon its inside adjacent its ends, and longitudinal grooves extending from the ends, and leading into the first mentioned grooves, end caps provided with flanges, a projection upon said flanges adapted to engage said grooves, and a flaring flange carried by the first mentioned flange adapted to project without the cylinder and to support the same while in a horizontal position.

3. A device of the kind described comprising a cylindrical body portion, said body portion being perforated, end caps, and outwardly extending flanges carried by the caps and supporting the device when in a horizontal position.

FRANK ROBINSON.

Witnesses:
JNO. W. HAGERLUND,
F. O. ROBINSON.